United States Patent
Moon et al.

(10) Patent No.: US 8,526,337 B2
(45) Date of Patent: Sep. 3, 2013

(54) METHOD AND APPARATUS FOR COMMUNICATION IN A TDD-BASED WIRELESS COMMUNICATION SYSTEM

(75) Inventors: Seong Ho Moon, Anyang-si (KR); Min Seok Noh, Anyang-si (KR); Yeong Hyeon Kwon, Anyang-si (KR); Jin Sam Kwak, Anyang-si (KR); Dong Cheol Kim, Anyang-si (KR); Seung Hee Han, Anyang-si (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 12/937,628

(22) PCT Filed: Apr. 14, 2009

(86) PCT No.: PCT/KR2009/001922
§ 371 (c)(1),
(2), (4) Date: Oct. 13, 2010

(87) PCT Pub. No.: WO2009/128643
PCT Pub. Date: Oct. 22, 2009

(65) Prior Publication Data
US 2011/0032853 A1    Feb. 10, 2011

Related U.S. Application Data

(60) Provisional application No. 61/044,870, filed on Apr. 14, 2008, provisional application No. 61/048,543, filed on Apr. 28, 2008.

(30) Foreign Application Priority Data

Dec. 17, 2008   (KR) .................. 10-2008-0128321

(51) Int. Cl.
*H04J 3/00*    (2006.01)

(52) U.S. Cl.
USPC .......................................... 370/280

(58) Field of Classification Search
USPC ....... 370/321, 334, 315, 329, 280; 455/452.2
See application file for complete search history.

(56) References Cited

U.S. PATENT DOCUMENTS

| | | | |
|---|---|---|---|
| 2002/0061005 A1 | 5/2002 | Lee et al. | |
| 2005/0094605 A1 | 5/2005 | Sun et al. | |
| 2005/0201319 A1 | 9/2005 | Lee et al. | |
| 2008/0151809 A1* | 6/2008 | Chindapol et al. | 370/315 |
| 2008/0153506 A1* | 6/2008 | Yin et al. | 455/452.2 |
| 2010/0157928 A1* | 6/2010 | Spinar et al. | 370/329 |

FOREIGN PATENT DOCUMENTS

| | | |
|---|---|---|
| KR | 2002-0027283 A | 4/2002 |
| KR | 10-2005-0082037 A | 5/2005 |

* cited by examiner

*Primary Examiner* — Mark Rinehart
*Assistant Examiner* — Gbemileke Onamuti
(74) *Attorney, Agent, or Firm* — Birch, Stewart, Kolasch & Birch, LLP

(57) ABSTRACT

Disclosed is a method and an apparatus for communication in a TDD (Time Division Duplex) based wireless communication system. The present invention involves setting a first frame comprising a plurality of consecutive downlink subframes and a plurality of consecutive uplink subframes. The start point for the first uplink subframe in the plurality of consecutive uplink subframes, is located at a switching point in a second frame used by another system.

7 Claims, 10 Drawing Sheets

METHOD AND APPARATUS FOR COMMUNICATION IN A TDD-BASED WIRELESS COMMUNICATION SYSTEM

CROSS REFERENCE TO RELATED APPLICATIONS

This application is the National Phase of PCT/KR2009/001922 filed on Apr. 14, 2009 which claims priority under 35 U.S.C 119(e) of U.S. Provisional Application Nos. 61/044,870 filed on Apr. 14, 2008 and 61/048,543 filed on Apr. 28, 2008 and under 35 U.S.C 119(a) to Patent Application No. 10-2008-0128321 filed in Republic of Korea, on Dec. 17, 2008. The entire contents of all of the above applications are hereby incorporated by reference into the present application.

BACKGROUND OF THE INVENTION

1. Field of the Invention

The present invention relates to wireless communications, and more particularly, to coexistence with another time division duplex (TDD) system in a TDD-based wireless communication system.

2. Related Art

Wireless communication systems are widely spread all over the world to provide various types of communication services such as voice or data services. The wireless communication system is generally a multiple access system that can support communication with multiple users by sharing available radio resources (e.g., bandwidth, transmit power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, etc.

The institute of electrical and electronics engineers (IEEE) 802.16 standard provides a technique and protocol for supporting broadband wireless access. The standardization had been conducted since 1999 until the IEEE 802.16-2001 was approved in 2001. The IEEE 802.16-2001 is based on a physical layer of a single carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'. A standard based on the IEEE 802.16-2004/Cor1 is referred to as IEEE 802.16e or WiMAX.

In the IEEE 802.16 broadband wireless access working group, there is ongoing standardization effort for the IEEE 802.16m standard which is a new technical standard based on the IEEE 802.16e. The IEEE 802.16m standard requires flexible support for the conventional IEEE 802.16e standard as well as a new system. The IEEE 802.16m system is based on TDD. That is, uplink transmission and downlink transmission are achieved in the same frequency band at different times.

Deployment of various wireless communication systems results in a problem in coexistence between different systems. That is, the problem is that a plurality of systems provide services in the same region/time. In particular, in order for coexistence of the plurality of TDD systems, it is important to prevent uplink transmission and downlink transmission from being performed simultaneously. This is because a data loss may occur due to interference when downlink transmission and uplink transmission overlap between different TDD systems. In addition, symbol puncturing, time delay, or the like can be used to avoid interference, but this may cause a problem of decreasing spectral efficiency.

SUMMARY OF THE INVENTION

The present invention provides a frame structure for coexistence between different time division duplex (TDD) systems.

In an aspect, a method for communication in a time division duplex (TDD)-based wireless communication system is provided. The method include configuring a first frame comprising a plurality of contiguous downlink subframes and a plurality of contiguous uplink subframes, and transmitting data by using at least one downlink subframe or uplink subframe in the first frame, wherein a start point of a first uplink subframe among the plurality of contiguous uplink subframes is located in a switching point in a second frame in which another system is used.

The switching point may include a downlink pilot time slot (DwPTS), a guard period (GP), and an uplink pilot time slot (UpPTS). The start point of the first uplink subframe may be aligned with a start point of the UpPTS or a start point of the GP.

A length of the first frame may be 5 ms, and a length of the second frame may be 10 ms.

The method may further include receiving information on a frame offset for allowing the start point of the first uplink subframe to be located in the switching point in the second frame in which another system is used.

In another aspect, an apparatus for communication in a time division duplex (TDD)-based wireless communication system is provided. The apparatus include a frame configuration unit for configuring a first frame comprising a plurality of contiguous downlink subframes and a plurality of contiguous uplink subframes, wherein a start point of a first uplink subframe among the plurality of contiguous uplink subframes is located in a switching point in a second frame in which another system is used, and a transceiver for transmitting data by using at least one downlink subframe or uplink subframe in the first frame.

DESCRIPTION OF EXEMPLARY EMBODIMENTS

Figure 1:
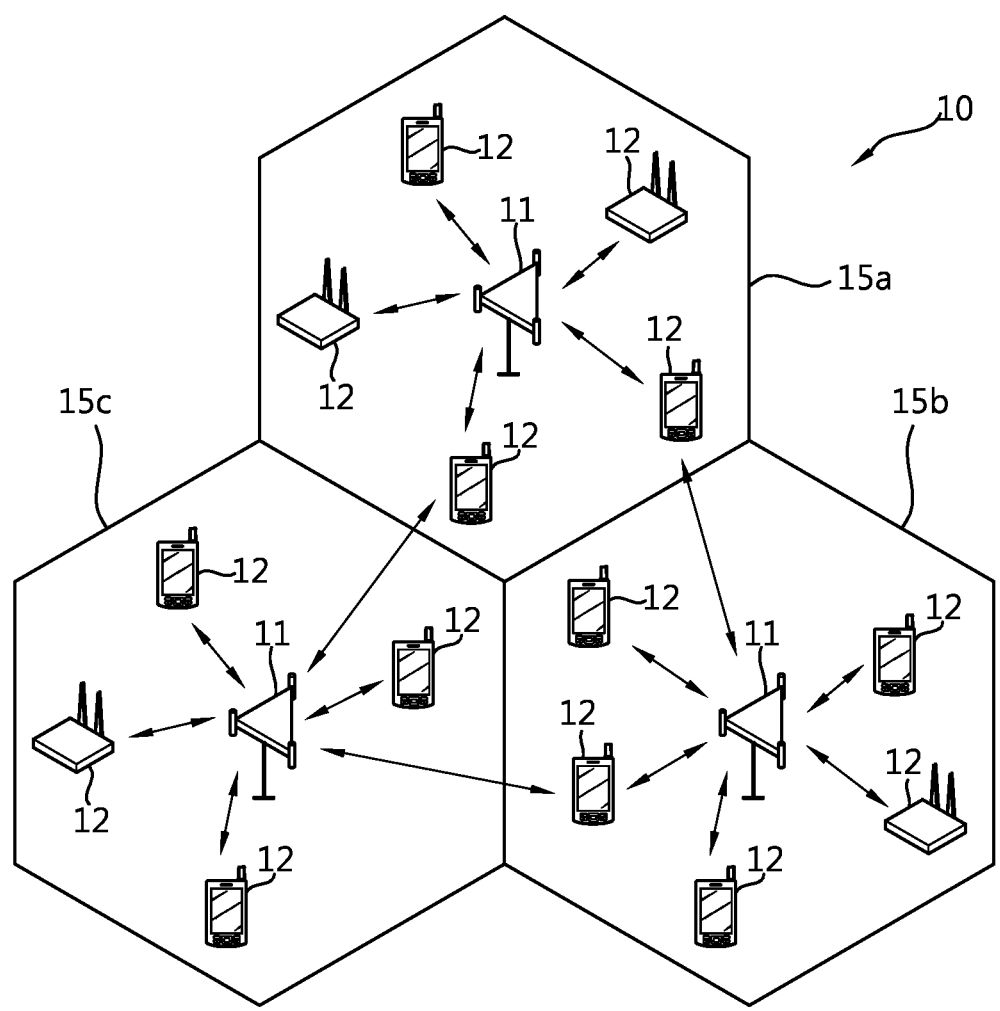
FIG. 1 shows a wireless communication system.

FIG. 1 shows a wireless communication system. A wireless communication system 10 includes at least one base station (BS) 11. Each BS 11 provides communication services to specific geographical regions (generally referred to as cells) 15a, 15b, and 15c. Each cell can be divided into a plurality of regions (referred to as sectors). A user equipment (UE) 12 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

A time division duplex (TDD) structure considered hereinafter is not limited only to a specific system. For explanation purposes only, the following description will be given by taking an example in which a TDD structure of an institute of electrical and electronics engineers (IEEE) 802.16m system coexists with a $3^{rd}$ generation partnership project (3GPP) long term evolution (LTE) TDD system. IEEE 802.16m is an evolution of IEEE 802.16e. 3GPP LTE is a part of evolved UMTS (E-UMTS) using E-UTRA, and employs orthogonal frequency division multiple access (OFDMA) in DL and single carrier frequency division multiple access (SC-FDMA) in UL.

The reason of selecting the IEEE 802.16m system and the LTE TDD system is that the IEEE 802.16m system has a frame structure in which a DL subframe and a UL subframe are included with 5 ms periodicity whereas the LTE TDD system has a frame structure having 5 ms periodicity and 10 ms periodicity.

Figure 2:
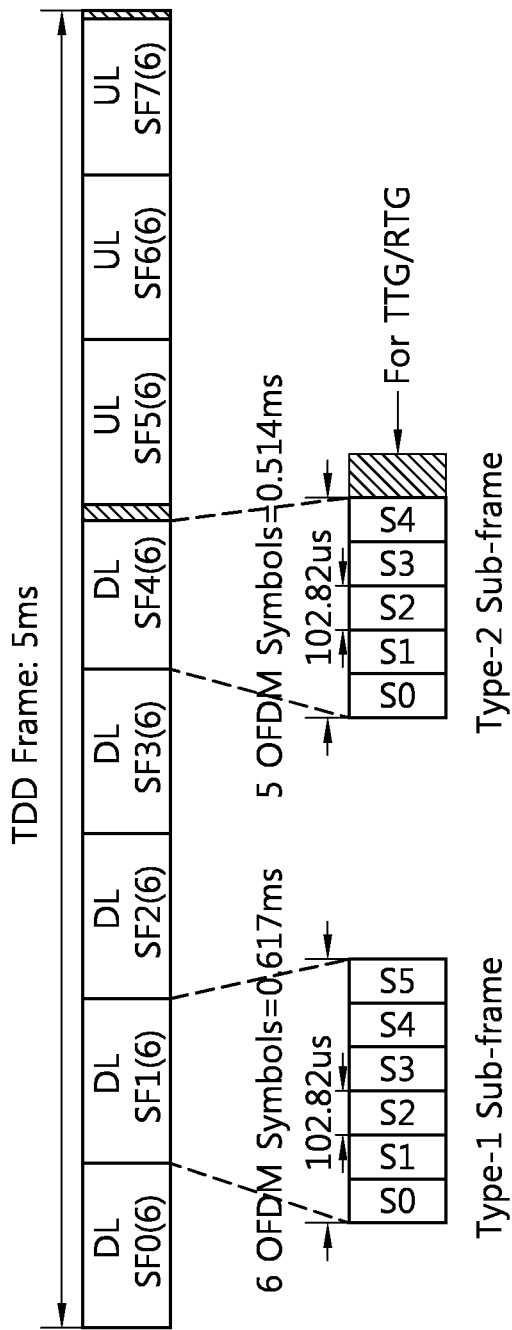
FIG. 2 shows a frame structure of an IEEE 802.16m system.

FIG. 2 shows a frame structure of an IEEE 802.16m system. A TDD frame includes 8 subframes SF0, SF1, SF2, SF3, SF4, SF5, SF6, and SF7. Each subframe can be used to transmit UL data or DL data. The subframe can consist of 6 OFDM symbols S0, S1, S2, S3, S4, and S5 or 5 OFDM symbols S0, S1, S2, S3, and S4, for exemplary purposes only. Hereinafter, a subframe consisting of 6 OFDM symbols is referred to as a type-1 subframe, and a subframe consisting of 5 OFDM symbols is referred to as a type-2 subframe. In TDD, each subframe is used for UL or DL in the same frequency at different times. That is, subframes in a TDD frame are divided into a UL subframe and a DL subframe. At least one of DL subframes and UL subframes is the type-2 subframe.

Between the DL subframe and the UL subframe, a transmit/receive transition gap (TTG)/receive/transmit transition gap (RTG) is deployed as an idle time for switching from UL to DL or switching from DL to UL. The TTG/RTG is also referred to as a switching point or an idle frame.

Hereinafter, a TDD structure in which some of parameters used in WiMAX profile are extracted is defined as a frame structure of a legacy system, on the basis of the IEEE 802.16e standard. Table 1 below shows an orthogonal frequency-division multiplexing (OFDM) parameter in the IEEE 802.16e system.

TABLE 1

| Transmission Bandwidth (MHz) | 5 | 10 | 20 |
|---|---|---|---|
| Over-sampling Factor | | 28/25 | |
| Sampling Frequency (MHz) | 5.6 | 11.2 | 22.4 |
| FFT Size | 512 | 1024 | 2048 |
| Sub-carrier Spacing (kHz) | | 10.94 | |
| OFDM Symbol Time, Tu (us) | | 91.4 | |

| Cyclic Prefix (CP) | Ts (us) | OFDM Symbols per Frame | Idle Time (us) |
|---|---|---|---|
| Tg = ¼ Tu | 91.4 + 22.85 = 114.25 | 43 | 87.25 |
| Tg = ⅛ Tu | 91.4 + 11.42 = 102.82 | 48 | 64.64 |
| Tg = 1/16 Tu | 91.4 + 5.71 = 97.11 | 51 | 47.39 |
| Tg = 1/32 Tu | 91.4 + 2.86 = 94.26 | 53 | 4.22 |

The TDD frame structure for the parameters has characteristics as follows: (1) A frame length is 5 ms; (2) Among the OFDM parameters of Table 1, a CP length is ⅛ Tu; (3) One frame consists of 8 subframes; and (4) UL and DL are divided in a subframe unit.

Herein, a cyclic prefix (CP) is a copy of a last time Tg of an useful symbol period, and can be denoted by a ratio with respect to a useful symbol time Tu.

Figure 3:
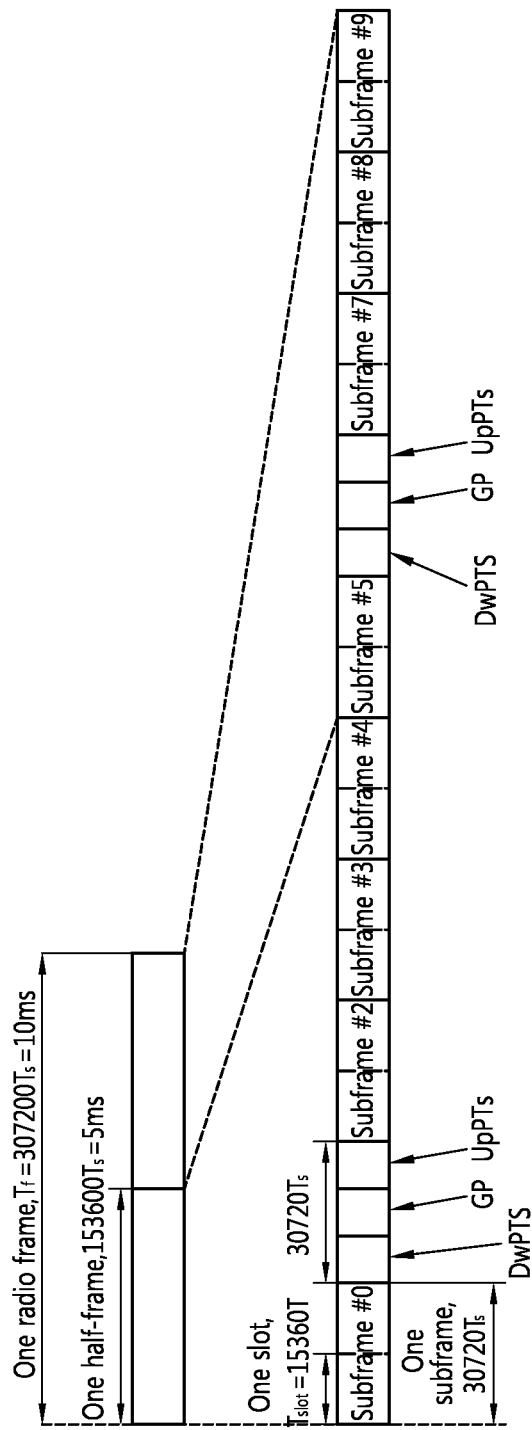
FIG. 3 shows a TDD frame structure of a 3GPP LTE system.

FIG. 3 shows a TDD frame structure of a 3GPP LTE system. The section 4.2 of 3GPP TS 36.211 V8.2.0 (2008-03) "Technical Specification; Evolved Universal Terrestrial Radio Access (E-UTRA); Physical Channels and Modulation (Release 8)" can be incorporated herein by reference.

Referring to FIG. 3, a radio frame consists of 2 half-frames. One half-frame consists of 10 subframes #0 to #9. The subframe may consist of 7 OFDM symbols in case of using a normal CP, and may consist of 6 OFDM symbols in case of using an extended CP.

UL and DL are divided in a subframe unit, and a UL subframe and a DL subframe are separated by a switching point. The switching point is located between the UL subframe and the DL subframe and is a specific period for dividing UL and DL. At least one switching point exists in the radio frame. The switching point includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization adjustment of a UE. The GP is a guard period for removing interference that occurs in UL due to a multiple-path delay of a DL signal between UL and DL.

Table 2 shows a structure of a frame that can be configured according to deployment of a UL subframe and a DL subframe in an LTE TDD system. 'D' denotes a DL subframe, 'U' denotes a UL subframe, and 'S' denotes a switching point, i.e., DwPTS+GP+UpPTS.

TABLE 2

| configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In configurations 0 to 2, DL and UL are switched with a switching-point periodicity of 5 ms. In configuration 3 to 5, DL and UL are switched with a switching-point periodicity of 10 ms.

Table 3 shows a method of configuring the DwPTS, the GP, and the UpPTS considered in the LTE system. Ts denotes a sampling time, and is calculated to $1/(15000*2048)$ (sec).

TABLE 3

| configuration | Normal cyclic prefix | | | Extended cyclic prefix | | |
|---|---|---|---|---|---|---|
| | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

9 combinations are possible in case of a normal CP, and 7 combinations are possible in case of an extended CP.

For coexistence between the IEEE 802.16m system and the LTE system, a method of configuring the different frames becomes problematic. This is because interference may occur when UL transmission and DL transmission overlap in heterogeneous systems. For coexistence between the IEEE 802.16m and the LTE system, there is a need to avoid a case where the IEEE 802.16m transmits UL data (or DL data) and the LTE system transmits DL data (or UL data) at the same time.

Figure 4:
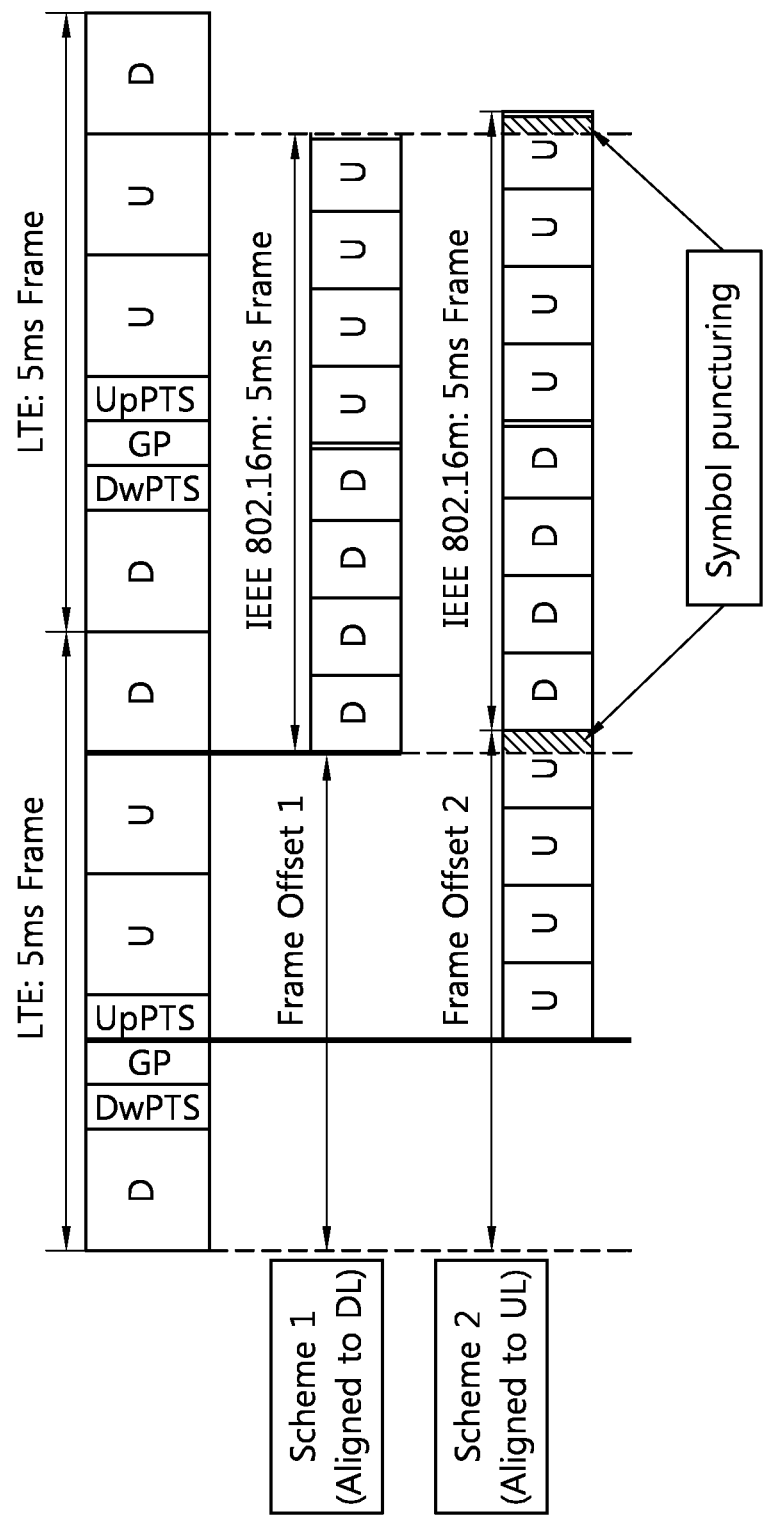
FIG. 4 shows a method for coexistence using a frame offset.

FIG. 4 shows a method for coexistence using a frame offset. An IEEE 802.16m frame uses a frame offset for coexistence with a frame having a switching-point periodicity of 5 ms in an LTE system. The frame offset is used to align a DL transmission duration and/or a UL transmission duration of two systems to the maximum extent possible. Overlapping of the DL duration and the UL duration is avoided by puncturing a part of duration. A scheme 1 is a scheme in which a DL start point of IEEE 802.16m is aligned to a DL start point of LTE. A frame offset 1 is information for aligning the DL start point of IEEE 802.16m to the DL start point of the LTE. Herein, a time difference to the DL start point of IEEE 802.16m from a start point of an LTE frame is defined as the frame offset 1. A scheme 1 is a scheme in which a UL start point of IEEE 802.16m is aligned to a start point of a UpPTS or GP of LTE. A frame offset 2 is information for aligning the UL start point of IEEE 802.16m to the start point of the UpPTS or GP of LTE. Herein, a time difference to the DL start point of IEEE 802.16m from a start point of an LTE frame is defined as the frame offset 2. Information on the frame offset 1 and/or the frame offset 2 is a part of system information or a super frame header (SFH), and can be reported by a BS to the UE. In this case, an OFDM symbol needs to be punctured in some parts of the duration due to a difference between an OFDM parameter of IEEE 802.16m and an OFDM parameter of LTE.

A DL/UL ratio of IEEE 802.16m according to three DL/UL ratios of 5 ms periodicity of LTE used in the schemes 1 and 2, and the number of OFDM symbols required to be punctured are summarized as shown in Table 4.

TABLE 4

| | LTE TDD DL/UL Ratio | | | | | |
| --- | --- | --- | --- | --- | --- | --- |
| | 1:3 | | 2:2 | | 3:1 | |
| | DL/UL ratio for 802.16m TDD in 5 ms frame, Punctured symbols in 5 ms frame | | | | | |
| Conf. | Scheme 1 (Aligned to DL) | Scheme 2 (Aligned to UL) | Scheme 1 (Aligned to DL) | Scheme 2 (Aligned to UL) | Scheme 1 (Aligned to DL) | Scheme 2 (Aligned to UL) |
| Normal CP | | | | | | |
| 0 | 2:6 or 3:5, none | 3:5, one | 4:4, none | 3:5, three | 6:2, none | 5:3, one |
| 1 | 3:5, none | 3:5, two | 5:3, one | 4:4, two | 6:2, none | 6:2, none |
| 2 | 3:5, none | 3:5, one | 5:3, one | 4:4, two | 6:2, none | 6:2, none |
| 3 | 3:5, none | 3:5, one | 5:3, one | 4:4, three | 7:1, three | 6:2, one |
| 4 | 3:5, none | 3:5, one | 5:3, one | 4:4, four | 7:1, three | 6:2, one |
| 5 | 2:6 or 3:5, none | 3:5, none | 4:4, none | 3:5, three | 6:2, none | 5:3, one |
| 6 | 3:5, none | 3:5, none | 5:3, two | 4:4, two | 6:2, none | 6:2, none |
| 7 | 3:5, none | 3:5, none | 5:3, two | 4:4, two | 6:2, none | 6:2, none |
| 8 | 3:5, none | 3:5, none | 5:3, two | 4:4, three | 7:1, four | 6:2, one |
| Extended CP | | | | | | |
| 0 | 3:5, none | 3:5, one | 4:4, none | 3:5, four | 6:2, none | 5:3, one |
| 1 | 3:5, none | 3:5, one | 5:3, one | 4:4, two | 7:1, none | 6:2, none |
| 2 | 3:5, none | 3:5, one | 5:3, one | 4:4, three | 6:2 or 7:1, none | 6:2, none |
| 3 | 3:5, none | 3:5, one | 5:3, one | 4:4, three | 7:1, none | 6:2, one |
| 4 | 3:5, none | 3:5, none | 4:4, none | 3:5, four | 7:1, none | 5:3, one |
| 5 | 3:5, none | 3:5, none | 5:3, two | 4:4, two | 6:2, none | 6:2, none |
| 6 | 3:5, none | 3:5, none | 5:3, two | 4:4, three | 7:1, four | 6:2, none |

Now, a case where a 3GPP LTE TDD frame having a repetition period greater than 5 ms coexists with an IEEE 802.16m frame will be taken into account.

Hereinafter, a method of solving a mutual coexistence problem will be described by defining a virtual frame which is adjusted to a size of an IEEE 802.16m frame having a shorter period by properly fragmenting DL and UL deployment of an LTE frame having a longer period. In addition, a method of applying the present invention to a case where the IEEE 802.16m TDD frame coexists with an LTE TDD frame with 10 ms periodicity and having configurations 3, 4, and 5 will be described.

When the IEEE 802.16m frame structure coexists with the configurations 3, 4, and 5 of the 3GPP LTE TDD system, the number of OFDM symbols punctured to decrease mutual interference between DL and UL is increased when transmitting an IEEE 802.16m frame since a repetition period differs between DL and UL.

Figure 5:
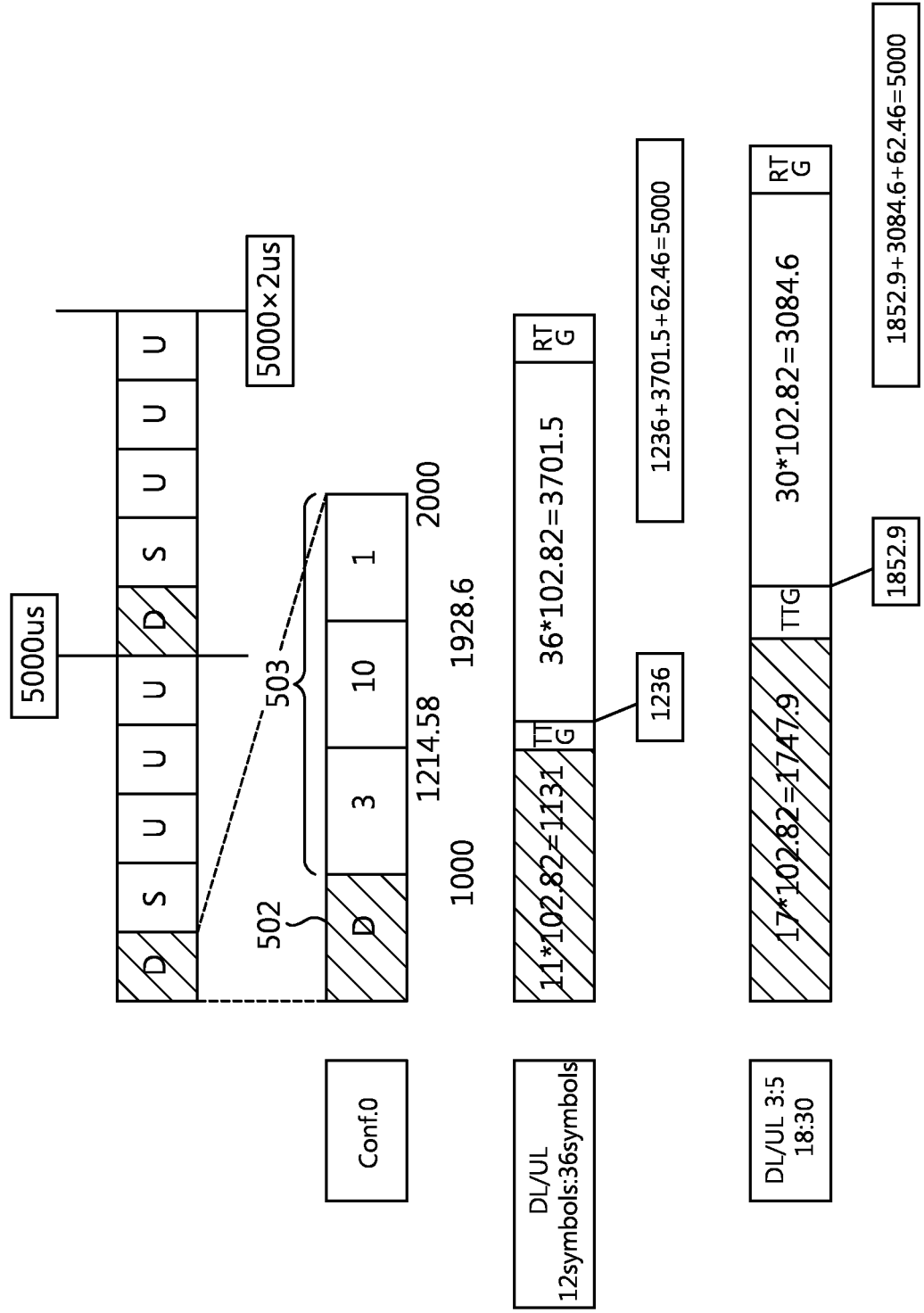
FIG. 5 shows coexistence between an IEEE 802.16m frame and an LTE TDD frame having a repetition period of 5 ms.

FIG. 5 shows coexistence between an IEEE 802.16m frame and an LTE TDD frame having a repetition period of 5 ms. A slashed part represents a DL duration. In case of an LTE TDD configuration 0 having a normal CP, LTE has a DL/UL ratio of 1:3. In this case, a length of a duration obtained by summing a first DL subframe 502 and a switching point 503 is 2000 us. If a DL/UL ratio of IEEE 802.16m is configured with 2:6 or 3:5 within 5 ms and if a proper frame offset is found between two frames, a DL duration or UL duration of IEEE 802.16m or a UL duration or DL duration of LTE can be prevented from overlapping with each other. Therefore, there may be no OFDM symbol to be punctured.

Figure 6:
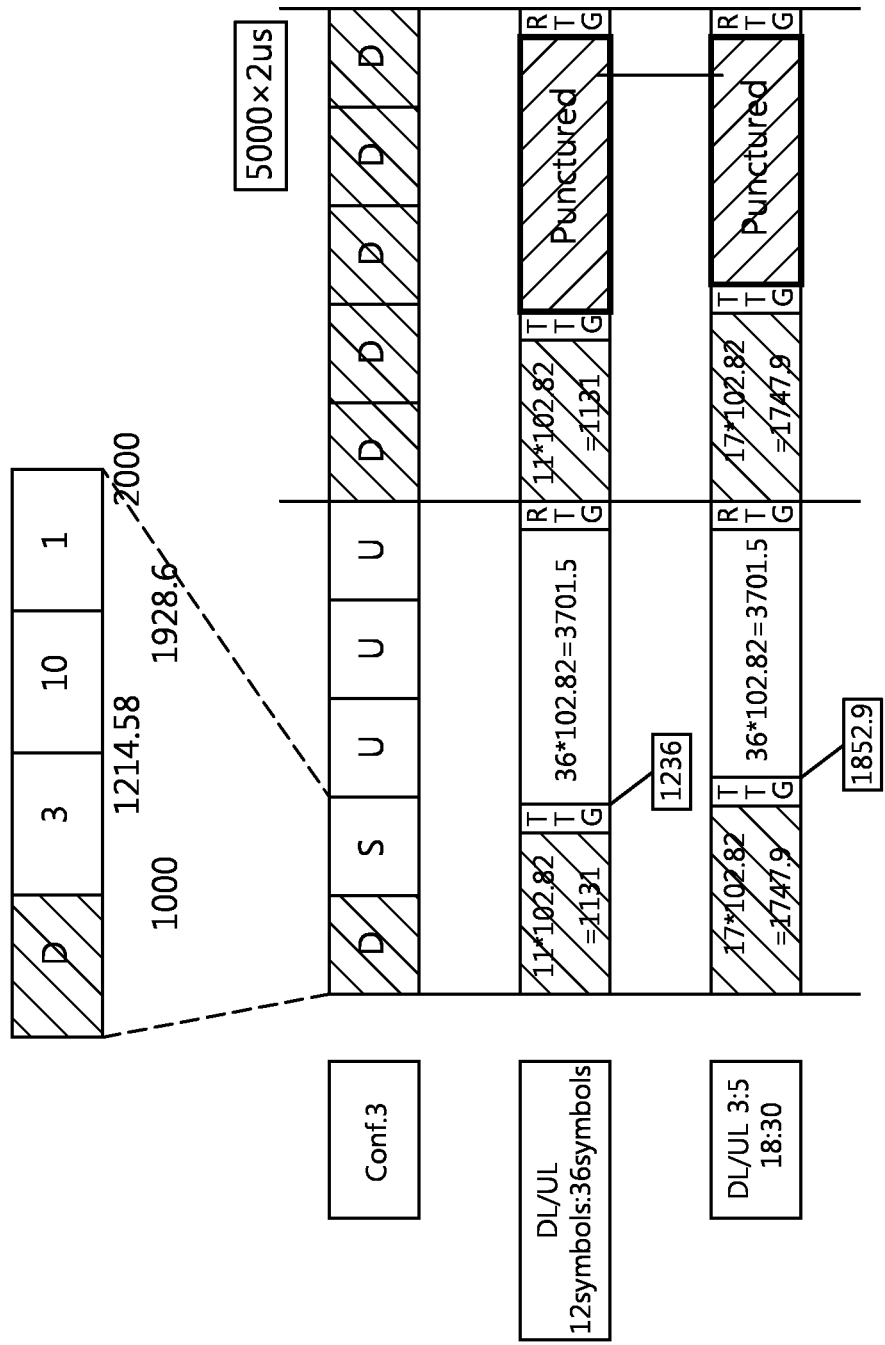
FIG. 6 shows coexistence between an IEEE 802.16m frame and an LTE TDD frame having a repetition period of 10 ms.

FIG. 6 shows coexistence between an IEEE 802.16m frame and an LTE TDD frame having a repetition period of 10 ms. In a case where a 3GPP LTE configuration 3 having a repetition period of 10 ms coexists with an IEEE 802.16m frame having a repetition period of 5 ms, no OFDM symbol is punctured for an IEEE 802.16m frame overlapping with a first portion of 5 ms in LTE, whereas many OFDM symbols are inevitably punctured in a last portion of 5 ms.

Now, coexistence between different TDD systems using a virtual frame will be described.

A TDD frame is defined in a unit in which at least one DL subframe and at least one UL frame are repeated. In a case where a TDD frame structure 1 of a frame size of T1 coexists with a TDD frame structure 2 designed to have a frame size of T2 (=T1*n) which is an integer n multiple of T1, a virtual frame can be defined as a frame obtained by fragmenting the TDD frame structure 2 by the size T1. When n virtual frames are continuously deployed according to an order, it must represent the TDD frame structure 2 completely. Therefore, the virtual frame can be defined only for a large-sized frame.

Figure 7:
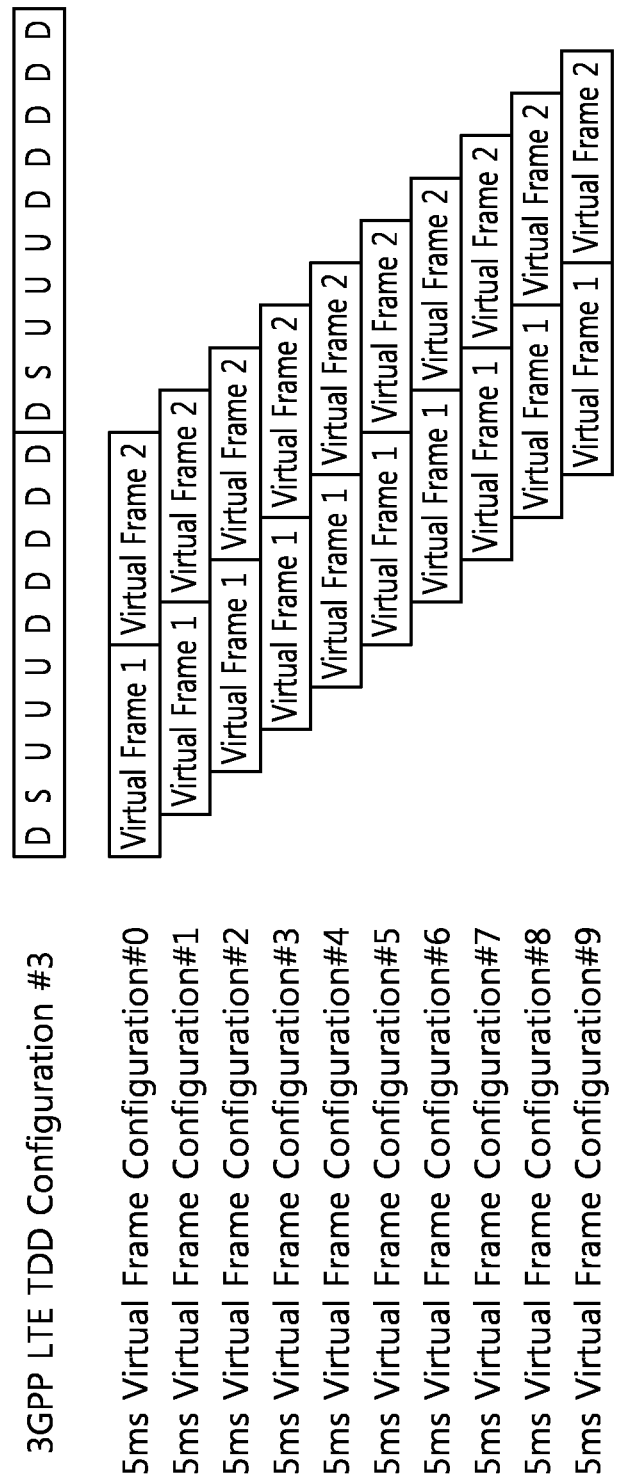
FIG. 7 shows an example of combinations of virtual frames.

FIG. 7 shows an example of combinations of virtual frames. 10 possible combinations of virtual frames are shown in case of using a configuration 3 of 3GPP LTE TDD for coexistence of a 5 ms TDD frame. Although the combinations of virtual frames are configured by shifting them in one subframe unit of LTE in the present embodiment, the virtual frames can be configured by shifting them in an OFDM symbol unit or a sampling time unit.

As to a 10 ms frame structure in LTE TDD, the virtual frames can be configured in a unit of 5 ms, and can be configured with different configurations. For example, when it is considered that a frame length of IEEE 802.16m is 5 ms, the virtual frame can be interpreted as an IEEE 802.16m frame, and continuous IEEE 802.16m frames can use different TDD configurations (i.e., different DL/UL ratios). In this case, the present invention also includes a case where the virtual frame consists of only UL or DL.

<Method of Adjusting Frame Synchronization to Start Point of Virtual Frame>

In a case where a TDD frame structure 1 of a frame size of T1 coexists with a TDD frame structure 2 designed to have a frame size of T2 (=T1*n) which is an integer n multiple of T1, a start point of the TDD frame structure is aligned to a start point of any one of m virtual frames. When it is assumed that a most suitable virtual frame configuration is selected, DL and UL may be misaligned between two systems, and thus symbol puncturing can be reduced to improve spectral efficiency.

<Method of Configuring Virtual Frame>

In a case where a TDD frame structure 1 of a frame size of T1 coexists with a TDD frame structure 2 designed to have a frame size of T2 (=T1*n) which is an integer n multiple of T1, a virtual frame can be configured such that DL and UL are deployed in a most similar pattern as deployment of DL and UL of the TDD frame structure 1. This is because spectral efficiency can be improved by decreasing symbol puncturing caused by DL and UL misalignment between two systems. More specifically, a virtual frame can be configured such that the number of switching points can be equal between DL and UL.

For example, when the TDD frame structure 1 has one switching point, a virtual frame of the TDD frame structure 2 is also configured to have one switching point. In another method, if a frame of the TDD frame structure 1 starts from DL, the virtual frame can be configured to start from DL. If the frame of the TDD frame structure 1 starts from UL, the virtual frame can be configured to start from UL.

<Method of Providing Different DL/UL Configuration to Each Frame>

In a case where a TDD frame structure 1 of a frame size of T1 coexists with a TDD frame structure 2 designed to have a frame size of T2 (=T1*n) which is an integer n multiple of T1, the TDD frame structure 1 has to have a frame of a different DL/UL ratio in each frame, and this can be repeated in every $n^{th}$ frame. For example, since 3GPP LTE TDD has a repetition period of 10 ms and IEEE 802.16m has a repetition period of 5 ms, a frame configuration of IEEE 802.16m can be configured such that a DL/UL ratio is a:b in an even frame and is c:d in an odd frame. In this case, the DL/UL ratio possible for the even frame and the odd frame does not necessarily have a DL/UL ratio for all possible cases for a 5 ms frame. System overhead can be reduced by limiting several methods according to a method of configuring an LTE TDD frame having a repetition period of 10 ms.

More specifically, there is a method of reporting a DL/UL ratio to a receiver by transmitting control information regarding a frame configuration in every frame while maintaining a possible DL/UL configuration table of a system having a repetition period of 5 ms. In addition, there is another method for adding a DL/UL configuration element suitable for a frame size of a system having a greater repetition period and coexisting in a possible DL/UL configuration table of a system having a repetition period of 5 ms and for reporting a DL/UL configuration for use in a process of initial network entry.

<DL/UL Configuration in Virtual Frame Unit and Method for Coexistence Using Combination Thereof>

In a case where a TDD frame structure 1 of a frame size of T1 coexists with a TDD frame structure 2 designed to have a frame size of T2 (=T1*n) which is an integer n multiple of T1, a DL/UL configuration of the frame structure 1 can be configured such that a configured virtual frame x (x=1, 2, ..., n) and the frame structure 1 have a minimum number of punctured symbols and an optimal frame offset value can be configured with respect to a virtual frame x and the DL/UL configuration of the frame structure 1. By combining n configuration methods, an optimal method in which the frame structure 1 and the frame structure 2 coexist can be found. For example, if the IEEE 802.16m system and the 3GPP LTE TDD system coexist, a possible 16 m DL:UL ratio can be obtained by using an IEEE 802.16m DL:UL ratio possible for configurations 0, 1, and 2 having 5 ms periodicity of LTE and by combining the configurations 0, 1, and 2 with respect to configurations 3, 4, and 5.

Table 5 shows a possible DL/UL ratio of IEEE 802.16m according to an LTE TDD configuration.

TABLE 5

| Conf. | Switch-point periodicity | Subframe number | | | | | | | | | | IEEE 802.16m DL:UL |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | (2:6) or (3:5) |
| 1 | 5 ms | D | S | U | U | D | D | S | U | U | D | (3:5), (4:4), or (5:3) |
| 2 | 5 ms | D | S | U | D | D | D | S | U | D | D | (5:3), (6:2), or (7:1) |
| 3 | 10 ms | D | S | U | U | U | D | D | D | D | D | (2:6) + (8:0) or (3:5) + (8:0) |
| 4 | 10 ms | D | S | U | U | D | D | D | D | D | D | (3:5) + (8:0), (4:4) + (8:0), or (5:3) + (8:0) |
| 5 | 10 ms | D | S | U | D | D | D | D | D | D | D | (5:3) + (8:0), (6:2) + (8:0), or (7:1) + (8:0) |
| 6 | 10 ms | D | S | U | U | U | D | S | U | U | D | (2:6) + (3:5), (2:6) + (4:4), (2:6) + (5:3), (3:5) + (3:5), (3:5) + (4:4), or (3:5) + (5:3) |

In case of the configurations 0, 1, and 2, the DL/UL ratio can be seen as a value determined as a frame offset and an optimal DL:UL ratio of IEEE 802.16m for coexistence in the conventional method. In case of the configuration 3, if subframes 0 to 4 are regarded as a virtual frame 1 and subframes 5 to 9 are regarded as a virtual frame 2, as to the virtual frame 1, optimal coexistence can be achieved with a DL:UL ratio of (2:6) and (3:6) as obtained in the configuration 0, and as to the virtual frame 2, optimal coexistence can be achieved with a configuration of (8:0) in which all frames consist of only DL. Therefore, a configuration in which the number of punctured symbols is minimized can be achieved by a configuration of (2:6)+(8:0) or (3:5)+(8:0) which is a combination of optimal frame configuration methods for respective two virtual frames. Likewise, in case of the configuration 4, a subframe 9 and subframes 0 to 3 are set to one virtual frame 1, and the remaining subframes 4 to 8 are set to the virtual frame 2. In this case, as to the virtual frame 1, (3:5), (4:4), or (5:3) found in the configuration 0 is used, and as to the virtual frame 2, an optimal configuration can be found by using a DL/UL combination configuration of (8:0). A similar method can be possible for a configuration 5. In particular, in case of a configuration 6, an optimal configuration combination can be found by setting a virtual frame in an OFDM symbol unit instead of a subframe unit. To obtain an optimal combination, a first virtual frame can be configured to start from a GP of an S frame of a subframe 1, a second virtual frame can be configured to start from a GP or a UpPTS of an S frame of a subframe 6, and configuration methods of the configuration 0 and the configuration 1 are respectively applied thereto. Therefore, the total number of possible DL:UL ratios is 6, i.e., (2:6)+(3:5), (2:6)+(4:4), (2:6)+(5:3), (3:5)+(3:5), (3:5)+(4:4), or (3:5)+(5:3).

Therefore, when designing configuration information of the IEEE 802.16m frame, a DL/UL configuration for 10 ms periodicity is included in a DL/UL configuration for the conventional 5 ms periodicity by considering coexistence with LTE TDD as shown in Table 6. Table 6 shows a DL:UL configuration of IEEE 802.16m considering coexistence with an LTE TDD frame having 10 ms periodicity.

TABLE 6

| | 16m DL:UL Configuration | DL:UL (# of sub-frames) |
|---|---|---|
| 5 ms periodicity | 0 | 8:0 |
| | 1 | 7:1 |
| | 2 | 6.2 |
| | 3 | 5:3 |
| | 4 | 4:4 |
| | 5 | 3:5 |
| | 6 | 2:6 |
| | 7 | 1:7 |
| 10 ms periodicity | 8 | (2:6) + (8:0) |
| | 9 | (3:5) + (8:0) |
| | 10 | (4:4) + (8:0) |
| | 11 | (5:3) + (8:0) |
| | 12 | (6:2) + (8:0) |
| | 13 | (7:1) + (8:0) |
| | 14 | (2:6) + (3:5) |
| | 15 | (2:6) + (4:4) |
| | 16 | (2:6) + (5:3) |
| | 17 | (3:5) + (3:5) |
| | 18 | (3:5) + (4:4) |
| | 19 | (3:5) + (5:3) |

Table 7 shows an example of decreasing DL/UL configurations supported for the configuration 6 into 2 types considering coexistence with the LTE TDD frame in comparison with Table 6.

TABLE 7

| | 16m DL:UL Configuration | DL:UL (# of sub-frames) |
|---|---|---|
| 5 ms periodicity | 0 | 8:0 |
| | 1 | 7:1 |
| | 2 | 6:2 |
| | 3 | 5:3 |
| | 4 | 4:4 |
| | 5 | 3:5 |
| | 6 | 2:6 |
| | 7 | 1:7 |
| 10 ms periodicity | 8 | (2:6) + (8:0) |
| | 9 | (3:5) + (8:0) |
| | 10 | (4:4) + (8:0) |
| | 11 | (5:3) + (8:0) |
| | 12 | (6:2) + (8:0) |
| | 13 | (7:1) + (8:0) |
| | 14 | (3:5) + (3:5) |
| | 15 | (3:5) + (4:4) |

Figure 8:
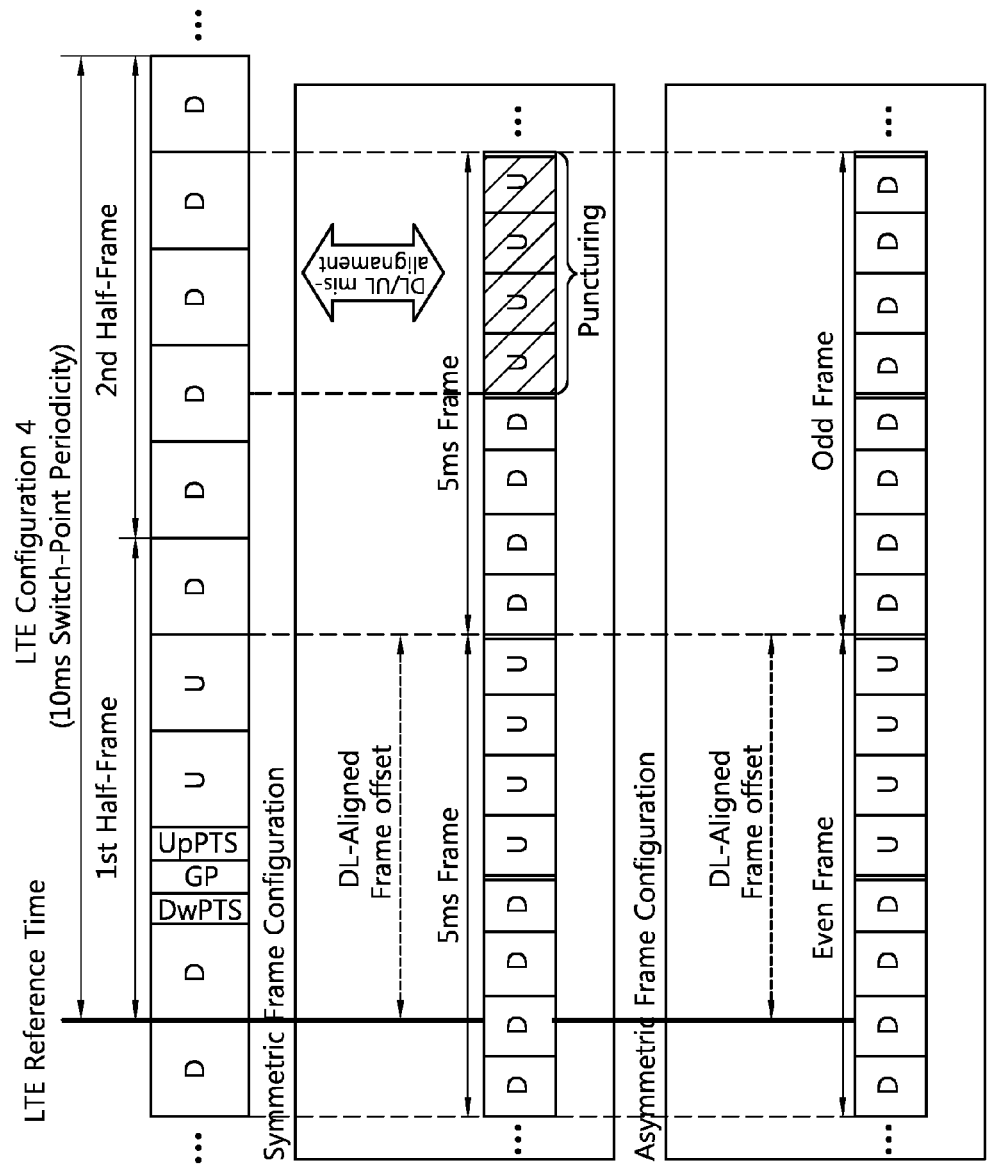
FIG. 8 shows an IEEE 802.16m frame structure for coexistence with the configuration 4 of LTE TDD.

FIG. 8 shows an IEEE 802.16m frame structure for coexistence with the configuration 4 of LTE TDD. A start point of an IEEE 802.16m extended frame is defined as a point at which contiguous DL subframes included in an LTE TDD frame start. The conventional IEEE 802.16m frame structure having a DL/UL ratio of 4:4 is a symmetric frame structure since the same frame structure is repeated. According to this structure, for coexistence with a second half-frame consisting of only DL subframes, a DL duration of an IEEE 802.16m frame overlapping with the second half-frame is punctured.

In comparison thereto, in a state where the subframes 9 and the subframes 0 to 3 included in LTE TDD are set to an even frame and the remaining subframes 4 to 8 are set to an odd frame, if an IEEE 802.16m frame is defined as (2:6)+(8:0), (4:4)+(8:0) or (3:5)+(8:0) as shown in Table 5, symbol puncturing is unnecessary. The even frame and the odd frame are for representing two frames, and there is no restriction on their orders. A total length of the even frame and the odd frame is 10 ms. A new frame having a length of 10 ms including the even frame and the odd frame is referred to as an extended frame. Herein, an IEEE 802.16m frame configured to (4:4)+(8:0) are shown for example, and has an asymmetric structure in that frames having two different DL/UL ratios are repeated. A start point of the extended frame is a start point at which contiguous DL subframes appear. In this case, a frame offset is a duration from a start point of an LTE TDD frame (referred to as an LTE reference time) to a start point of the extended frame.

Although the LTE TDD configuration 4 is described for example herein, the same method can also apply to the configurations 3 and 5.

Figure 9:
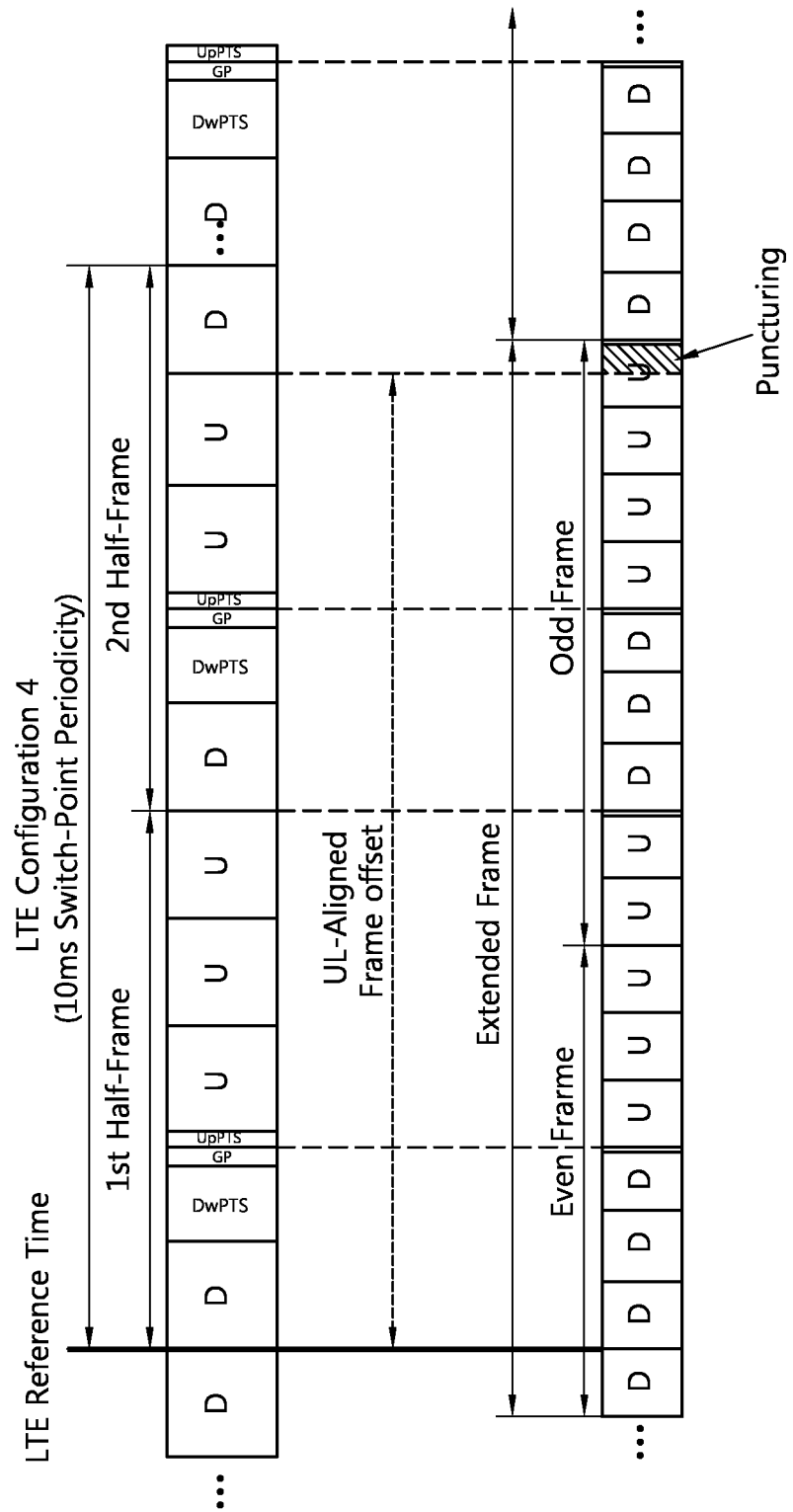
FIG. 9 shows an IEEE 802.16m frame structure for coexistence with the configuration 6 of LTE TDD.

FIG. 9 shows an IEEE 802.16m frame structure for coexistence with the configuration 6 of LTE TDD. An extended frame includes an even frame and an odd frame. The even frame has a DL/UL ratio of 4:4, and the odd frame has a DL/UL ratio of 3:4. This frame structure is an asymmetric frame structure in which frames having different DL/UL ratios are repeated. A start point of the extended frame is set to a start point at which a large number of contiguous DL subframes exist among a plurality of contiguous DL subframes (herein, a start point of the even frame). In this case, a frame offset is a duration from an LTE reference time to a start point of the extended frame.

When an extended frame, i.e., an IEEE 802.16m 10 ms frame, is defined as shown in FIG. 8 and FIG. 9, a DL/UL ratio for maintaining the number of optimal punctured symbols can be summarized as shown in the following table. Table 8 shows a possible DL/UL ratio of an extended frame based on an LTE TDD configuration.

TABLE 8

| Conf. | Switch-point periodicity | Subframe number | | | | | | | | | | IEEE 802.16m 10 ms DL:UL (DL:UL:DL:UL for Configuration 6) |
|---|---|---|---|---|---|---|---|---|---|---|---|---|
| | | 0 | 1 | 2 | 3 | 4 | 5 | 6 | 7 | 8 | 9 | |
| 3 | 10 ms | D | S | U | U | U | D | D | D | D | D | 10:6 or 11:5 |
| 4 | 10 ms | D | S | U | U | D | D | D | D | D | D | 12:4 or 13:3 |
| 5 | 10 ms | D | S | U | D | D | D | D | D | D | D | 14:2 or 15:1 |
| 6 | 10 ms | D | S | U | U | U | D | S | U | U | D | 4:5:3:4 or 3:6:2:5 or 4:6:2:4 |

Table 9 shows a DL:UL configuration value of an IEEE 802.16m extended frame considering coexistence with an LTE TDD frame.

TABLE 9

| | 16m DL:UL Configuration | DL:UL (# of sub-frames) (DL:UL:DL:UL for 16m configuration 14, 15, 16) |
|---|---|---|
| 5 ms periodicity | 0 | 8:0 |
| | 1 | 7:1 |
| | 2 | 6:2 |
| | 3 | 5:3 |
| | 4 | 4:4 |
| | 5 | 3:5 |
| | 6 | 2:6 |
| | 7 | 1:7 |
| 10 ms periodicity | 8 | 10:6 |
| | 9 | 11:5 |
| | 10 | 12:4 |
| | 11 | 13:3 |
| | 12 | 14:2 |
| | 13 | 15:1 |
| | 14 | 4:5:3:4 |
| | 15 | 3:6:2:5 |
| | 16 | 4:6:2:4 |

Therefore, in order to design control information for the IEEE 802.16m frame, there is a need to consider a DL/UL ratio for a 10 ms frame for Table 6 or Table 7 or to consider configuration information for the 10 ms frame. Information on the DL/UL ratio of the 5 ms frame or the 10 ms frame can be configured with combinations mentioned above in Tables 6, 7, and 9 or a subset thereof.

For coexistence with another TDD network, a frame having an asymmetric DL/UL ratio is proposed. A more detailed configuration is exemplified in Tables 6, 7, and 9. According to the proposed asymmetric frame structure, selective configuration is possible in a unit of 5 ms or 10 ms. Frame configuration information can be reported by a BS to a UE as a part of system information or a broadcast message. Indication for coexistence with another TDD network can also be transmitted separately or together with the configuration information.

Figure 10:
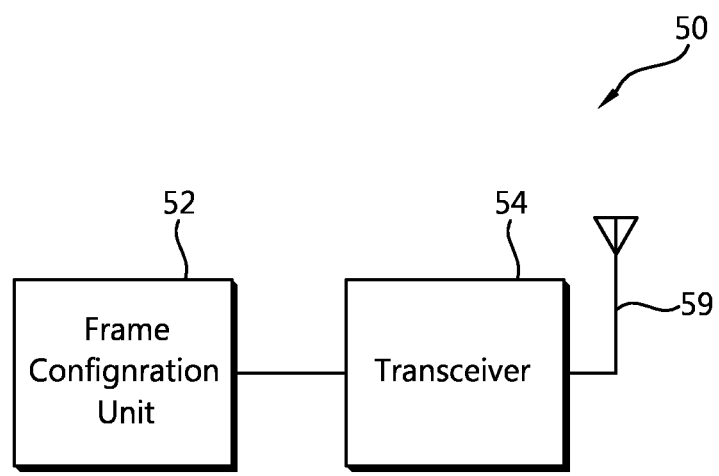
FIG. 10 shows an apparatus for wireless communication according to an embodiment of the present invention.

FIG. 10 shows an apparatus for wireless communication according to an embodiment of the present invention. The apparatus for wireless communication may be a part of a UE or a part of a BS. An apparatus 50 for wireless communication includes a frame configuration unit 52, a transceiver 54, and an antenna 59. When the apparatus 50 for wireless communication operates as a transmitter, the frame configuration unit 52 configures a TDD frame for coexistence with another network according to frame configuration information. The transceiver 54 transmits data by using the TDD frame. Further, the frame configuration unit 52 transmits the frame configuration information on the configured TDD frame to a receiver. When the apparatus 50 for wireless communication operates as the receiver, the frame configuration unit 52 receives data by using the TDD frame configured according to the frame configuration information.

According to the present invention, interference can be avoided while avoiding overlapping of uplink transmission and downlink transmission between time division duplex (TDD) systems when a plurality of TDD systems coexist. In addition, spectral efficiency can be improved by minimizing the number of orthogonal frequency-division multiplexing (OFDM) symbols requiring puncturing.

The present invention can be implemented using hardware, software, or a combination of them. In the hardware implementations, the present invention can be implemented using an application specific integrated circuit (ASIC), a digital signal processor (DSP), a programmable logic device (PLD), a field programmable gate array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method for communication in a time division duplex (TDD)-based wireless communication system where a first system and a second system coexist wherein the first system and the second system are different systems from each other, the method comprising:
    configuring a first frame for the first system to include at least one downlink subframe and at least one uplink subframe;
    configuring a second frame for the second system to include a plurality of virtual frames, a size of the second frame being integer n times of a size of the first frame, a size of each of the plurality of virtual frames being identical with the size of the first frame; and
    transmitting data by using the first frame for the first system and the second frame for the second system,
    wherein the first frame is configured to have a minimum number of punctured symbols and a frame offset with one of the plurality of virtual frames,
    wherein a start point of the first frame is aligned to a start point of one of the plurality of virtual frames, and
    wherein a number of switching points in each of the plurality of virtual frames is equal to a number of switching points in the first frame.

2. The method of claim 1, wherein the switching point in each of the plurality of virtual frames includes a downlink pilot time slot (DwPTS), a guard period (GP), and an uplink pilot time slot (UpPTS).

3. The method of claim 1, wherein the start point of the first frame is an uplink subframe, and
    wherein the start point of one of the plurality of virtual frames is an uplink subframe.

4. The method of claim 1, wherein the start point of the first frame is a downlink subframe, and
    wherein the start point of one of the plurality of virtual frames is a downlink subframe.

5. The method of claim 1, wherein a length of the first frame is 5 ms, and a length of the second frame is 10 ms.

6. The method of claim 1, wherein the first system is an institute of electrical and electronics engineers (IEEE) 802.16m system, and
    wherein the second system is a $3^{rd}$ generation partnership project (3GPP) long term evolution (LTE) system.

7. An apparatus configured to communicate in a time division duplex (TDD)-based wireless communication system where a first system and a second system coexist, wherein the first system and the second system are different systems from each other, the apparatus comprising:
    a frame configuration unit adapted to configure a first frame for the first system to include at least one downlink subframe and at least one uplink subframe, and a second frame for the second system to include a plurality of virtual frames, a size of the second frame being integer n times of a size of the first frame, a size of each of the plurality of virtual frames being identical with the size of the first frame,
    wherein the first frame is configured to have a minimum number of punctured symbols and a frame offset with one of the plurality of virtual frames,
    wherein a start point of the first frame is aligned to a start point of one of the plurality of virtual frames, and
    wherein a number of switching points in each of the plurality of virtual frames is equal to a number of switching points in the first frame; and
    a transceiver configured to transmit data by using the first frame for the first system and the second frame for the second system.

* * * * *